United States Patent [19]

An

[11] Patent Number: 4,665,452
[45] Date of Patent: May 12, 1987

[54] CASSETTE EJECTOR FOR VIDEO CASSETTE RECORDER

[75] Inventor: Hee K. An, Suwon, Rep. of Korea

[73] Assignee: Samsung Electronics Co., Ltd., Kyungki, Rep. of Korea

[21] Appl. No.: 758,448

[22] Filed: Jul. 24, 1985

[30] Foreign Application Priority Data

Jul. 25, 1984 [KR] Rep. of Korea ............... 1984-7167

[51] Int. Cl.⁴ .......................................... G11B 15/18
[52] U.S. Cl. .................................. 360/96.5; 360/96.1
[58] Field of Search ................. 360/96.1, 96.3, 96.4, 360/96.5

[56] References Cited

U.S. PATENT DOCUMENTS 4,458,276  7/1984  Okada et al. ................. 360/96.5
4,577,246  3/1986  Matsuki ........................ 360/96.5
4,586,096  4/1986  Okada .......................... 360/96.5

Primary Examiner—A. Michael Chambers
Assistant Examiner—John C. Fox
Attorney, Agent, or Firm—Oblon, Fisher, Spivak, McClelland, & Maier

[57] ABSTRACT

A cassette ejector for a video cassette recorder, including an actuation plate actuated by a side plate when a loading motor moves a pinch roller, thereby to release locking of a cassette holding member. The actuation plate has a push element and a pushed element extending therefrom and is formed with first and second through-holes in which first and second levers are respectively fitted. The first lever has a cam-like projection and a press-element provided thereon, and the second lever has a tongue-like element and a drive rod provided thereon. The levers are coupled to each other and to the actuation plate by means of plural springs. When the tongue-like element is rotated by a movement of the side plate, the second lever undergoes a rotational movement which is coupled to the first lever by means of the drive rod whereby the press element engages the pushed element, translates the actuation plate and results in release of a locking pin which holds a hook-like locking member forming part of the cassette holding member. The plural springs urge the actuation plate and the first and second levers back to their original position after the second lever engages the first lever and after the side plate is retracted.

1 Claim, 7 Drawing Figures (A)

(B)

CASSETTE EJECTOR FOR VIDEO CASSETTE RECORDER

BACKGROUND OF THE INVENTION

1. Field of the Invention

This invention relates to a cassette ejector for a video cassette recorder of the upper loading type, and more precisely to a cassette holding member ejector for a small-sized video cassette recorder which is adapted to eject a cassette from the video cassette recorder utilizing the power of a loading motor instead of a solenoid.

2. Description of the Prior Art

A conventional cassette ejector for a video cassette recorder (hereinafter referred to as "VCR") typically constructed as shown in FIG. 4. More particularly, it includes a main deck 16, a solenoid 27 mounted on the bottom surface of the main deck 16 through a bracket 28, an ejection lever 29 which projects upward from the deck 16 and is pivotally connected at a middle portion thereof to an ejection bracket 28', a solenoid actuation rod 27' connected through a pin 20 to the ejection lever 29, and a lock lever 22 pivotally supported on the deck so as to be oscillated by a spring 21 and adapted to be forced by the upper end of the ejection lever 29 to release the locking of the cassette holding member and eject the cassette from the VCR.

However, such a conventional cassette ejector has the disadvantages of increased manufacturing cost and substantially increased weight, because it necessarily requires an expensive and weighty solenoid. Further, the use of such a solenoid in the cassette ejector results in the cassette ejector consuming much power. Further, the conventional cassette ejector is so constructed that when a tape cassette is loaded in the cassette holding member, a slide plate 23, as shown in FIG. 5, is moved in the rightward direction with respect to the deck to drive a pinch roller 24, so that the pinch roller 24 forcedly presses a tape against a capstan rod 25 to interpose the tape between the pinch roller 24 and the capstan rod 25. Also, the slide plate 23 is adapted to permit the right end 23' thereof to close the inner side of a through-hole 26 fromed at the deck 26 to prevent the rear end of the lock lever 22 from fitting in the through-hole 26, so that even when an ejection button is carelessly pushed in the state that a tape cassette is loaded in a VCR for reproduction or so called "play", the cassette may be prevented from being ejected from the VCR to prevent damage to a tape. However, such a structure is necessarily formed together with a mechanism for transmitting the actuation of the solenoid to the cassette ejecting construction provided above deck. Thus, the conventional cassette ejector is complicated in structure and requires many parts, resulting in substantially increased stages in the manufacturing process and the deck being rendered large in size due to the large space occupied by the parts.

SUMMARY OF THE INVENTION

The present invention has been made in view of the foregoing disadvantage of the prior art.

Accordingly, it is an object of the present invention to provide a cassette ejector for a VCR which is adapted to actuate an actuation plate by means of a slide plate which is actuated by a loading gear rotated due to the driving of a loading motor to move a pinch roller, to thereby release the locking of the cassette holding member.

In accordance with the present invention, there is provided a cassette ejector for a video cassette recorder including an actuation plate having a push element and a pushed element each provided at the side thereof so as to upward extend therefrom, the actuation plate being formed with first and second through-holes; first and second levers respectively fitted in the first and second through-holes, the first lever having a cam-like projection and a press element provided thereon in a manner to be projected therefrom and the second lever being provided with a tongue-like element and a drive rod; a hook-like locking member mounted on a lower end of a cassette holding member; and a locking pin provided to hold the hook-like locking member and be abutted against the upper end of the push element.

BRIEF DESCRIPTION OF THE DRAWINGS

These and other objects and many of the attendant advantages of the present invention will be readily appreciated as the same becomes better understood by reference to the following detailed description when considered in connection with the accompanying drawings, wherein.

DETAILED DESCRIPTION OF THE PREFERRED EMBODIMENT

Figure 1:
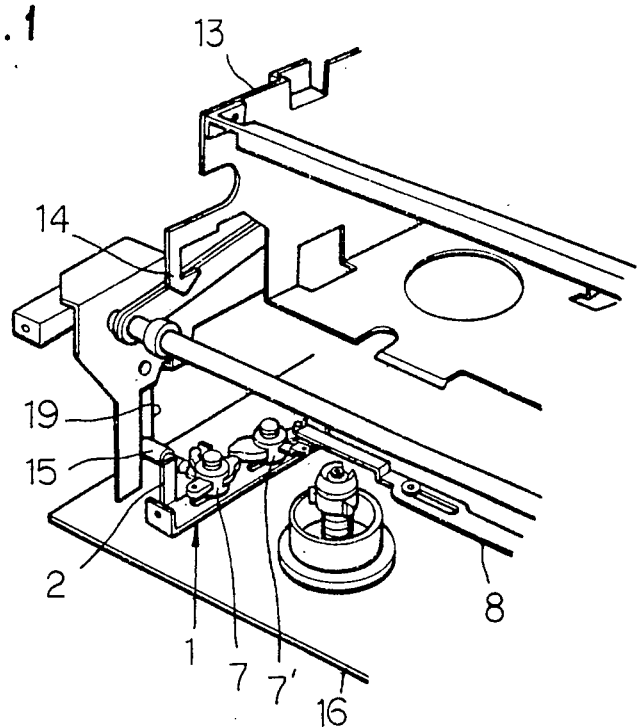
FIG. 1A is a schematic perspective view showing an example of a manner of incorporating an embodiment of a cassette ejector according to the present invention in a VCR.
FIG. 1B is a perspective view of the cassette ejector shown in FIG. 1A.
Figure 1:
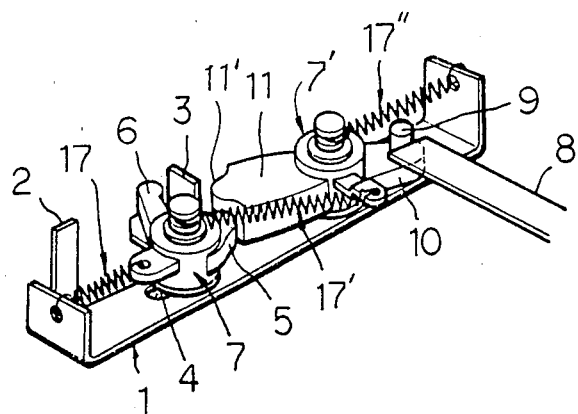

Referring now to the drawings, where like reference numerals designate identical or corresponding parts in the several views, a cassette ejector for a VCR according to the present invention will be described.

Figure 2:
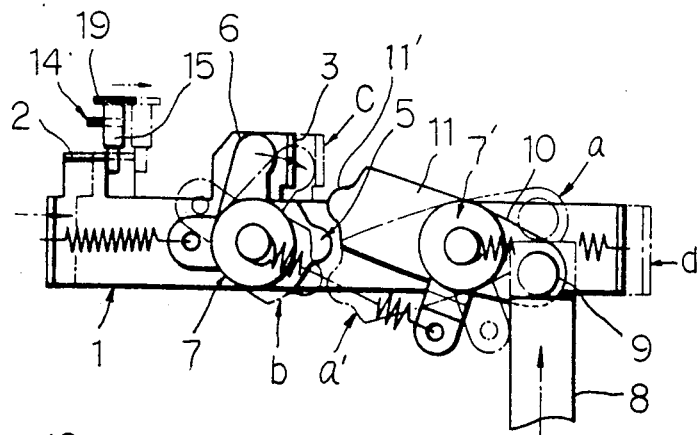
FIGS. 2A and 2B each are a plan view showing the actuation of the cassette ejector shown in FIG. 1A.
Figure 2:
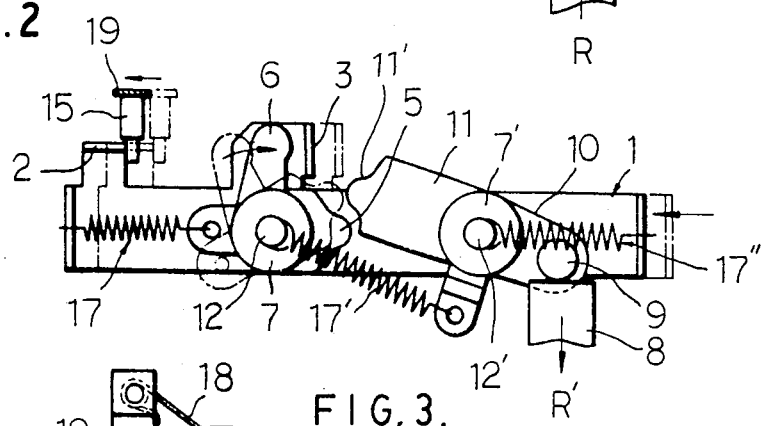
Figure 3:
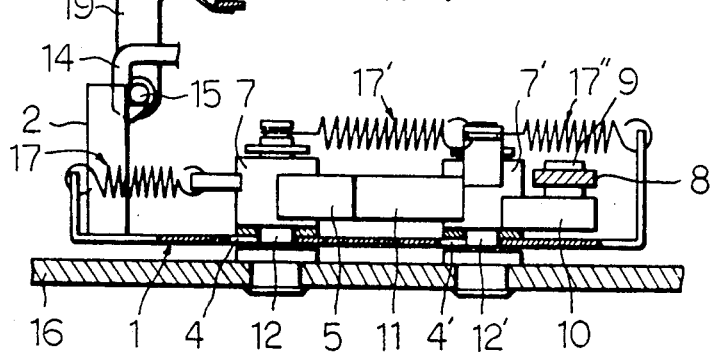
FIG. 3 is a partially exploded side elevation view showing the setting of a cassette ejector according to the present invention.
Figure 4:
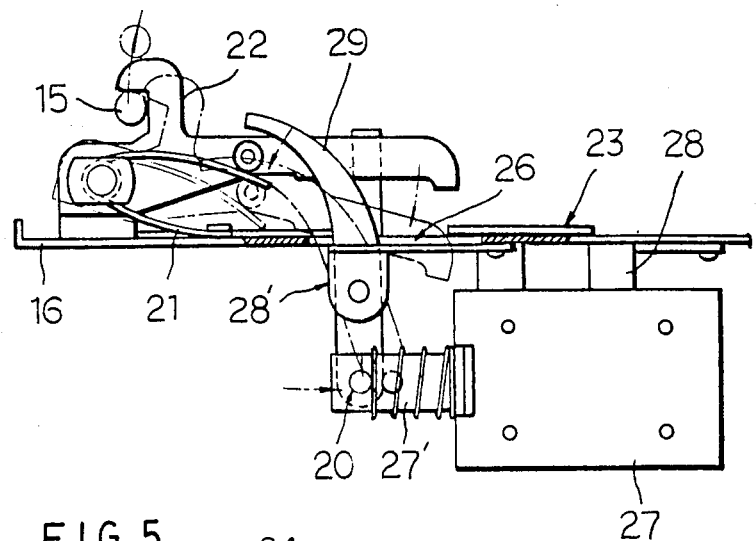
FIG. 4 is a side elevation showing a manner of incorporating a conventional cassette ejector in a VCR.
Figure 5:
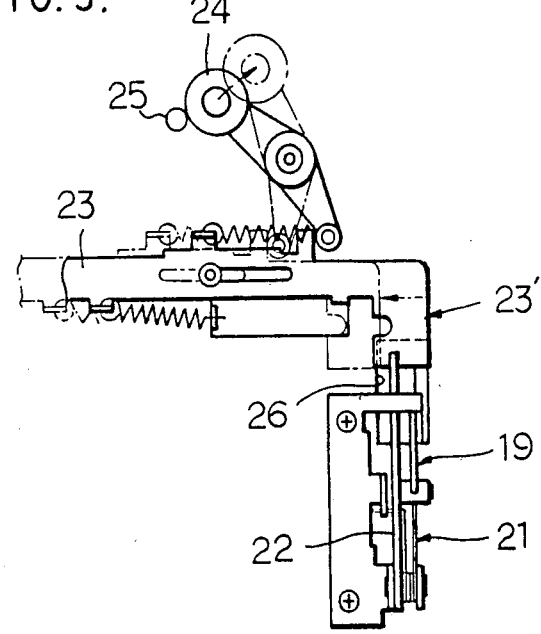
FIG. 5 is a plan view showing the actuation of a slide plate for preventing the malfunction of a lock lever in a conventional cassette ejector.

FIGS. 1 to 3 illustrate an embodiment of a cassette ejector according to the present invention. A cassette ejector of the illustrated embodiment, as shown in FIG. 1, includes an actuation plate 1 which has a push element 2 and a pushed element 3 provided on one side portion thereof in a manner to upward extend therefrom and be spaced from each other. In the embodiment illustrated, the push element 2 and pushed element 3 are formed by bending upward parts of the actuation plate 1. The actuation plate 1, as shown in FIG. 3, is formed with a pair of elliptic through-holes 4 and 4' so as to be spaced from each other in the longitudinal direction thereof, in which levers 7 and 7' are fittedly mounted through pins 12 and 12'. The lever 7 is provided on the peripheral surface thereof with a cam-like projection 5 and a press element 6 in a manner to be spaced from each other. The lever 7' includes a tongue-like element 10 provided with a pin 9 with which the end of a slide plate 8 is contacted and a drive rod 11 formed at the tip end thereof with a projection 11'. The push element 2 is adapted to be contacted at the upper end thereof with a locking pin 15 which acts to hold a hook-like locking member 14 provided at the lower end of a side plate of a cassette holding member 13.

The cassette ejector provided above the main deck 16 also includes tension springs 17, 17' and 17", a spring 18 for returning the locking pin 15 to the original position, and a support element 19 for securely holding the locking pin 15.

Now, the manner of operation of the cassette ejector of the illustrated embodiment will be described hereinafter.

First, when an eject button is pushed, a loading motor is reversely driven in order to eject a loaded cassette, the tape of which is in unloaded condition. With the actuation of the loading motor, the slide plate 8, as shown in FIG. 2A, is moved in the direction indicated by an arrow R to push the pin 9. Then, when the unloading of the tape is completed, the slide plate 8 will have pushed the tongue-like element 10 of the lever 7' to a position indicated by phantom lines a, so that the lever 7' may be rotated cause the drive rod 11' to be moved to a position indicated by phantom lines a'. At this time, the projection 11' provided at the tip end of the drive rod 11 pushes the cam-like projection 5 of the lever 7 arranged in proximity to the drive rod 11 to cause it to be moved to a position indicated by phantom lines b. This results in the lever 7 being rotated to rotate the press element 6 to move the pushed element 3 to a position indicated by phantom lines c, so that the actuation plate 1 may be moved to a position indicated by phantom lines d. Concurrently, the push element 2 pushes the locking pin 15 to release the hook-like locking member 14 of the cassette holding member 13 from the locking pin 15, resulting in the cassette holding member 13 being ejected.

In the cassette ejector of the illustrated embodiment, as described above, the actuation plate 1 is provided with the elliptic through-holes 4 and 4' which are spaced from each other in the longitudinal direction thereof, and the levers 7 and 7' are loosely fitted in the elliptic through-holes 4 and 4' and securely mounted via the through-holes 4 and 4' on the main deck 16; thus, the movement of only the actuation plate 1 is smoothly carried out. Also, the cam-like projection 5 is pushed to the position of the phantom lines b by the drive rod 11, to thereby be released from the drive rod 11, and concurrently the lever 7 is reversely rotated to the original position due to the contraction force of the tension spring 17 attached thereto. This also causes the press element 6 to be returned to the original position.

This results in the pushed element 3 forced by the press element 6 being released from the constraint by the press element 6 and returned to the original position due to the contraction of the tension spring 17' which was stretched due to the movement of the actuation plate 1 to the position of the phantom lines d. Also, the locking pin 15 forced by the push element 2 is returned to the original position due to the elastic force of the spring 18 applied thereto through the support element 19. Thus, the cassette holding member 13 with or without a cassette can be locked when it is pushed down and the hook-like locking member 14 is hooked up on the locking pin 15.

As can be seen from the foregoing, in the cassette ejector of the illustrated embodiment, when the normal rotation of the loading motor permits the slide plate 8 to be moved in the direction indicated by an arrow R' as shown in FIG. 2B, the lever 7' forced by the slide plate 8 is released from the constraint by the slide plate 8, so that the lever 7' may be reversely rotated due to the contraction force of the tension spring 17' to cause the drive rod 11 to be returned to the original position. During such operation, the projection 11' provided at the tip end of the drive rod 11 pushes the end of the cam-like projection 5 to a position indicated by phantom lines e. However, in this instance, the lever 7 is not rotated, resulting in the actuation plate 1 being not actuated. When the drive rod 11 goes past the end of the cam-like projection 5, the lever 7 is returned to the original position due to the contraction force of the tension spring 17.

Thus, it will be noted that the cassette ejector of the present invention is capable of effectively eliminating the use of a separate solenoid as in the prior art and adapted to smoothly carry out the locking and release of the cassette holding member by means of the slide plate moved due to the driving of the loading motor. Accordingly, the present invention substantially decreases parts and steps in the manufacturing process of the cassette ejector, resulting in a decrease in manufacturing cost and the VCR being sized smaller due to a decrease in parts to be mounted on the deck.

While a preferred embodiment of the present invention have been described with a certain degree of particularlity with reference to the drawings, obvious modifications and variations are possible in the light of the above teachings. It is therefore to be understood that within the scope of the appended claims, the invention may be practiced otherwise than as specifically described.

What is claimed as new and desired to be secured by Letters Patent of the United States is:

1. A cassette ejector for a video cassette recorder comprising:
    an actuation plate having a push element and a pushed element provided at a side of the actuation plate so as to extend upward from a bottom of the actuation plate, said actuation plate having first and second through-holes formed in the bottom thereof;
    first and second levers respectively fitted in said first and second through-holes, said first lever having a cam-like projection and a press element provided thereon in a manner to be projected therefrom and said second lever being provided with a tongue-like element and a drive rod;
    spring means for respectively coupling said first and second levers to said actuation plate and to each other;
    a locking member mounted on a lower end of a cassette holding member;
    a locking pin provided to hold the locking member and be abutted against an upper end of the push element;
    wherein when a cassette tape is to be ejected, a member in said recorder is coupled to said tongue-like element such that said second lever, said tongue-like element and said drive rod are rotated from a first position to a second position, said drive rod engages said cam-like projection resulting in rotation of said first lever, said cam-like projection and said press element from a first position to a second position, whereupon said press element pushes against said pushed element which results in a translation of said actuation plate and pushing of said locking pin by said push element to release said locking member, whereupon said drive rod ceases engaging said cam-like projection and under the urging of said spring means said first lever, said cam-like projection and said press element are returned to the first position thereof, and wherein when said recorder member ceases coupling said tongue-like element, said second lever, said tongue-like element and said drive rod are returned to the first position thereof under urging of said spring means.

* * * * *